(12) United States Patent
Matsko et al.

(10) Patent No.: US 8,761,555 B2
(45) Date of Patent: *Jun. 24, 2014

(54) WIDE-BAND RF PHOTONIC RECEIVERS AND OTHER DEVICES USING TWO OPTICAL MODES OF DIFFERENT QUALITY FACTORS

(71) Applicant: OEwaves, Inc., Pasadena, CA (US)

(72) Inventors: Andrey B. Matsko, Pasadena, CA (US); Anatoliy Savchenkov, Glendale, CA (US); David Seidel, Alta Loma, CA (US); Lute Maleki, Pasadena, CA (US); Vladimir Ilchenko, Arcadia, CA (US)

(73) Assignee: OEwaves, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/902,929

(22) Filed: May 27, 2013

(65) Prior Publication Data

US 2013/0258435 A1    Oct. 3, 2013

Related U.S. Application Data

(62) Division of application No. 12/510,244, filed on Jul. 27, 2009, now Pat. No. 8,452,139.

(60) Provisional application No. 61/083,844, filed on Jul. 25, 2008.

(51) Int. Cl.
*G02B 6/26* (2006.01)
*G02B 6/42* (2006.01)

(52) U.S. Cl.
USPC ................. 385/30; 385/28; 385/50

(58) Field of Classification Search
USPC .......................... 385/27, 28, 30, 50
See application file for complete search history.

(56) References Cited

U.S. PATENT DOCUMENTS

| | | |
|---|---|---|
| 5,204,640 A | 4/1993 | Logan, Jr. |
| 5,220,292 A | 6/1993 | Bianchini et al. |
| 5,723,856 A | 3/1998 | Yao et al. |

(Continued)

FOREIGN PATENT DOCUMENTS

| | | |
|---|---|---|
| WO | 01/96936 A1 | 12/2001 |
| WO | 2005/038513 A2 | 4/2005 |

(Continued)

OTHER PUBLICATIONS

Braginsky, V.B., et al., "Quality-Factor and Nonlinear Properties of Optical Whispering-Gallery Modes," Physics Letters A, 137(7, 8):393-397, May 1989.

(Continued)

*Primary Examiner* — Daniel Petkovsek
(74) *Attorney, Agent, or Firm* — Perkins Coie LLP

(57) ABSTRACT

This document provides techniques, apparatus and designs for using electro-optic WGM resonators that support two different families of optical WGM modes with different quality factors in various applications. A radio frequency (RF) resonator is formed on the optical resonator and structured to supply an RF field and spatially overlaps the RF field of the RF resonator with the first and second optical whispering gallery modes to cause RF energy in the RF field at a first RF carrier frequency to couple with the first optical whispering gallery mode and RF energy in the RF field at a second RF carrier frequency to couple with the second optical whispering gallery mode.

4 Claims, 6 Drawing Sheets

(56) References Cited

U.S. PATENT DOCUMENTS

| | | |
|---|---|---|
| 5,751,747 A | 5/1998 | Lutes et al. |
| 5,777,778 A | 7/1998 | Yao |
| 5,917,179 A | 6/1999 | Yao |
| 5,929,430 A | 7/1999 | Yao et al. |
| 5,985,166 A | 11/1999 | Unger et al. |
| 6,080,586 A | 6/2000 | Baldeschwieler et al. |
| 6,178,036 B1 | 1/2001 | Yao |
| 6,203,660 B1 | 3/2001 | Unger et al. |
| 6,389,197 B1 | 5/2002 | Iltchenko et al. |
| 6,417,957 B1 | 7/2002 | Yao |
| 6,473,218 B1 | 10/2002 | Maleki et al. |
| 6,476,959 B2 | 11/2002 | Yao |
| 6,487,233 B2 | 11/2002 | Maleki et al. |
| 6,488,861 B2 | 12/2002 | Iltchenko et al. |
| 6,490,039 B2 | 12/2002 | Maleki et al. |
| 6,535,328 B2 | 3/2003 | Yao |
| 6,567,436 B1 | 5/2003 | Yao et al. |
| 6,580,532 B1 | 6/2003 | Yao et al. |
| 6,594,061 B2 | 7/2003 | Huang et al. |
| 6,762,869 B2 | 7/2004 | Maleki et al. |
| 6,795,481 B2 | 9/2004 | Maleki et al. |
| 6,798,947 B2 | 9/2004 | Iltchenko |
| 6,853,479 B1 | 2/2005 | Ilchenko et al. |
| 6,871,025 B2 | 3/2005 | Maleki et al. |
| 6,873,631 B2 | 3/2005 | Yao et al. |
| 6,879,752 B1 | 4/2005 | Ilchenko et al. |
| 6,901,189 B1 | 5/2005 | Savchenkov et al. |
| 6,906,309 B2 | 6/2005 | Sayyah et al. |
| 6,922,497 B1 | 7/2005 | Savchenkov et al. |
| 6,928,091 B1 | 8/2005 | Maleki et al. |
| 6,943,934 B1 | 9/2005 | Ilchenko et al. |
| 6,987,914 B2 | 1/2006 | Savchenkov et al. |
| 7,024,069 B2 | 4/2006 | Savchenkov et al. |
| 7,043,117 B2 | 5/2006 | Matsko et al. |
| 7,050,212 B2 | 5/2006 | Matsko et al. |
| 7,061,335 B2 | 6/2006 | Maleki et al. |
| 7,062,131 B2 | 6/2006 | Ilchenko |
| 7,092,591 B2 | 8/2006 | Savchenkov et al. |
| 7,133,180 B2 | 11/2006 | Ilchenko et al. |
| 7,173,749 B2 | 2/2007 | Maleki et al. |
| 7,184,451 B2 | 2/2007 | Ilchenko et al. |
| 7,187,870 B2 | 3/2007 | Ilchenko et al. |
| 7,218,662 B1 | 5/2007 | Ilchenko et al. |
| 7,248,763 B1 | 7/2007 | Kossakovski et al. |
| 7,260,279 B2 | 8/2007 | Gunn et al. |
| 7,283,707 B1 | 10/2007 | Maleki et al. |
| 7,356,214 B2 | 4/2008 | Ilchenko |
| 7,362,927 B1 | 4/2008 | Ilchenko et al. |
| 7,369,722 B2 | 5/2008 | Yilmaz et al. |
| 7,389,053 B1 | 6/2008 | Ilchenko et al. |
| 7,400,796 B1 | 7/2008 | Kossakovski et al. |
| 7,440,651 B1 | 10/2008 | Savchenkov et al. |
| 7,450,790 B1 | 11/2008 | Jalali et al. |
| 7,460,746 B2 | 12/2008 | Maleki et al. |
| 7,480,425 B2 | 1/2009 | Gunn et al. |
| 7,515,786 B1 | 4/2009 | Matsko et al. |
| 7,587,144 B2 | 9/2009 | Ilchenko et al. |
| 7,715,081 B1 | 5/2010 | Krawczak |
| 8,452,139 B1 * | 5/2013 | Matsko et al. .......... 385/30 |
| 8,538,270 B2 * | 9/2013 | Seidel et al. .......... 398/140 |
| 2001/0038651 A1 | 11/2001 | Maleki et al. |
| 2002/0018611 A1 | 2/2002 | Maleki et al. |
| 2002/0018617 A1 | 2/2002 | Iltchenko et al. |
| 2002/0021765 A1 | 2/2002 | Maleki et al. |
| 2002/0081055 A1 | 6/2002 | Painter et al. |
| 2002/0085266 A1 | 7/2002 | Yao |
| 2002/0097401 A1 | 7/2002 | Maleki et al. |
| 2003/0160148 A1 | 8/2003 | Yao et al. |
| 2004/0100675 A1 | 5/2004 | Matsko et al. |
| 2004/0109217 A1 | 6/2004 | Maleki et al. |
| 2004/0218880 A1 | 11/2004 | Matsko et al. |
| 2004/0240781 A1 | 12/2004 | Savchenkov et al. |
| 2005/0017816 A1 | 1/2005 | Ilchenko et al. |
| 2005/0063034 A1 | 3/2005 | Maleki et al. |
| 2005/0074200 A1 | 4/2005 | Savchenkov et al. |
| 2005/0123306 A1 | 6/2005 | Ilchenko et al. |
| 2005/0128566 A1 | 6/2005 | Savchenkov et al. |
| 2005/0175358 A1 | 8/2005 | Ilchenko et al. |
| 2005/0248823 A1 | 11/2005 | Maleki et al. |
| 2007/0009205 A1 | 1/2007 | Maleki et al. |
| 2007/0153289 A1 | 7/2007 | Yilmaz et al. |
| 2008/0001062 A1 | 1/2008 | Gunn et al. |
| 2008/0075464 A1 | 3/2008 | Maleki et al. |
| 2008/0310463 A1 | 12/2008 | Maleki et al. |
| 2009/0097516 A1 | 4/2009 | Maleki et al. |
| 2009/0135860 A1 | 5/2009 | Maleki et al. |
| 2009/0208205 A1 | 8/2009 | Eliyahu et al. |
| 2009/0251705 A1 | 10/2009 | Le et al. |

FOREIGN PATENT DOCUMENTS

| | | |
|---|---|---|
| WO | 2005/055412 A2 | 6/2005 |
| WO | 2005/067690 A2 | 7/2005 |
| WO | 2005/122346 A2 | 12/2005 |
| WO | 2006/076585 A2 | 7/2006 |
| WO | 2007/143627 A2 | 12/2007 |

OTHER PUBLICATIONS

Eliyahu, D., et al., "Low Phase Noise and Spurious Levels in Multi-Loop Opto-Electronic Oscillators," Proceedings of the 2003 IEEE International Frequency Control Sympsoium and PDA Exhibition, pp. 405-410, May 2003.

Eliyahu, D., et al., "Modulation Response (S21) of the Coupled Opto-Electronic Oscillator," Proceedings of the 2005 IEEE International Frequency Control Symposium and Exposition, pp. 850-856, Aug. 2005.

Eliyahu, D., et al., "Tunable, Ultra-Low Phase Noise YIG Based Opto-Electronic Oscillator," IEEE MTT-S International Microwave Symposium Digest, 3:2185-2187, Jun. 2003.

Gorodetsky, M.L., et al., "Optical Microsphere Resonators: Optimal Coupling to High-Q Whispering-Gallery Modes," J. Opt. Soc. Am. B, 16(1):147-154, Jan. 1999.

Gorodetsky, M.L., et al., "Rayleigh Scattering in High-Q Microspheres," J. Opt. Soc. Am. B, 17(6):1051-1057, Jun. 2000.

Gorodetsky, M.L., et al., "Ultimate Q of Optical Microsphere Resonators," Optics Letters, 21(7):453-455, Apr. 1996.

Hryniewicz, J.V., et al., "Higher Order Filter Response in Coupled Microring Resonators," IEEE Photonics Technology Letters, 12(3):320-322, Mar. 2000.

Huang, S., et al., "A 'Turnkey' Optoelectronic Oscillator with Low Acceleration Sensitivity," 2000 IEEE/EIA International Frequency Control Symposium and Exhibition, pp. 269-279, Jun. 2000.

Ilchenko V. et al., "Electrooptically Tunable Photonic Microresonators and Photonic Bandgap Waveguide Coupling for Micro-Optoelectronic Oscillators," GOMACTech 2003, Tampa, Florida, pp. 1-4.

Ilchenko, V., et al., "High-Q Microsphere Cavity for Laser Stabilization and Optoelectronic Microwave Oscillator," Proceedings SPIE Microresonators and Whispering-Gallery Modes, vol. 3611, pp. 190-198, Jan. 1999.

Ilchenko, V., et al., "Microsphere Integration in Active and Passive Photonics Devices," Proc. of SPIE Laser Resonators III, vol. 3930, pp. 154-162, Jan. 2000.

Ilchenko, V., et al., "Microtorus: A High-Finesse Microcavity with Whispering-Gallery Modes," Optics Letters, 26 (5):256-258, Mar. 2001.

Ilchenko, V., et al., "Pigtailing the High-Q Microsphere Cavity: A Simple Fiber Coupler for Optical Whispering-Gallery Modes," Optics Letters, 24(11):723-725, Jun. 1999.

Ilchenko, V., et al., "Tunability and Synthetic Lineshapes in High-Q Optical Whispering Gallery Modes," Proc. of SPIE Laser Resonators and Beam Control VI, vol. 4969, pp. 195-206, Jan. 2003.

Ilchenko, V., et al., "Whispering-Gallery-Mode Electro-Optic Modulator and Photonic Microwave Receiver," J. Opt. Soc. Am. B, 20(2):333-342, Feb. 2003.

Ilchenko, V., et al., "Sub-Micro Watt Photonic Microwave Receiver," IEEE Photonics Technology Letters, 14 (11):1602-1604, Nov. 2002.

(56) References Cited

OTHER PUBLICATIONS

Ito, Id., et al., "InP/InGaAs Uni-Travelling-Carrier Photodiode with 310 GHz Bandwidth," Electronics Letters, 36 (21):1809-1810, Oct. 2000.

Logan, R., et al., "Stabilization of Oscillator Phase Using a Fiber-Optic Delay-Line," IEEE 45th Annual Symposium on Frequency Control, pp. 508-512, May 1991.

Maleki, L., "The Opto-Electronic Oscillator: Prospects for Extending the State of the Art in Reference Frequency Generation," International Topical Meeting on Microwave Photonics, pp. 195-198, Oct. 1998.

Matsko, A., et al., "Active Mode Locking with Whispering-Gallery Modes," J. Opt. Soc. Am. B, 20(11):2292-2296, Nov. 2003.

Matsko, A., et al., "Whispering-Gallery-Mode based Optoelectronic Microwave Oscillator," Journal of Modern Optics, 50(15-17):2523-2542, Feb. 2004.

Matsko, A., et al., "Whispering-Gallery-Mode Resonators as Frequency References. I. Fundamental Limitations," J. Opt. Soc. Am. B, 24(6):1324-1335, Jun. 2007.

Myers, L.E., et al., "Quasi-Phase-Matched Optical Parametric Oscillators in Bulk Periodically Poled LiNbO3," J. Opt. Soc. Am. B, 12(11):2102-2116, Nov. 1995.

Savchenkov, A., et al., "Whispering-Gallery-Mode Resonators as Frequency References. II. Stabilization," J. Opt. Soc. Am. B, 24(12):2988-2997, Dec. 2007.

Vassiliev, V.V., et al., "Narrow-Line-Width Diode Laser with a High-Q Microsphere Resonator," Optics Communications, 158(1-6):305-312, Dec. 1998.

Yao, X.S., et al., "A Novel Photonic Oscillator," Digest of the LEOS Summer Topical Meetings, pp. 17-18, Aug. 1995.

Yao, X.S., et al., "A Novel Photonic Oscillator," TDA Progress Report 42-122, pp. 32-43, Aug. 1995.

Yao, X.S., et al., "Converting Light into Spectrally Pure Microwave Oscillation," Optics Letters, 21(7):483-485, Apr. 1996.

Yao, X.S., et al., "Coupled Optoelectronic Oscillators for Generating Both RF Signal and Optical Pulses," Journal of Lightwave Tecnhology, 18(1):73-78, Jan. 2000.

Yao, X.S., et al., "Dual Microwave and Optical Oscillator," Optics Letters, 22(24):1867-1869, Dec. 1997.

Yao, X.S., et al., "Multiloop Optoelectronic Oscillator," IEEE Journal of Quantum Electronics, 36(1):79-84, Jan. 2000.

Yao, X.S., et al., "Optoelectronic Microwave Oscillator," J. Opt. Soc. Am. B, 13(8):1725-1735, Aug. 1996.

Yao, X.S., et al., "Optoelectronic Oscillator for Photonic Systems," IEEE Journal of Quantum Electronics, 32 (7):1141-1149, Jul. 1996.

Yu, J., et al., "Compact Optoelectronic Oscillator with Ultra-Low Phase Noise Performance," Electronics Letters, 35 (18):1554-1555, Sep. 1999.

\* cited by examiner

WIDE-BAND RF PHOTONIC RECEIVERS AND OTHER DEVICES USING TWO OPTICAL MODES OF DIFFERENT QUALITY FACTORS

PRIORITY CLAIMS AND RELATED PATENT APPLICATIONS

This application is a divisional application of U.S. patent application Ser. No. 12/510,244 filed Jul. 27, 2009 (now U.S. Pat. No. 8,452,139 B1), which claims the priority of U.S. Provisional Patent Application No. 61/083,844 filed Jul. 25, 2008. The entire content of the before-mentioned patent applications is incorporated by reference as part of the disclosure of this application.

BACKGROUND

This patent document relates to techniques, apparatus and systems for RF and photonic applications based on optical resonators.

Optical resonators can be configured in various configurations. Examples of well-known optical resonator designs includes Fabry-Perot optical resonators and optical ring resonators. As another example, an optical material such as a dielectric material may be shaped to construct an optical whispering-gallery-mode ("WGM") resonator which supports one or more resonator modes known as whispering gallery ("WG") modes. These WG modes represent optical fields confined in an interior region close to the surface of the resonator due to the total internal reflection at the boundary. Microspheres with diameters from few tens of microns to several hundreds of microns have been used to form compact optical WGM resonators. Such spherical resonators include at least a portion of the sphere that comprises the equator of the sphere. The resonator dimension is generally much larger than the wavelength of light so that the optical loss due to the finite curvature of the resonators is small. As a result, a high quality factor, Q, e.g., greater than $10^9$, may be achieved in such resonators. Hence, optical energy, once coupled into a whispering gallery mode, can circulate within the WGM resonator with a long photon life time. Such hi-Q WGM resonators may be used in many applications, including optical filtering, optical delay, optical sensing, lasers, and optoelectronic oscillators.

SUMMARY

This document provides techniques, apparatus and designs for using electro-optic WGM resonators that support two different families of optical WGM modes with different quality factors in various applications.

In one aspect, a device is provided to include an optical resonator comprising an electro-optic material having a refractive index responsive to an electric field and structured to support at least one first optical whispering gallery mode having a first quality factor, and at least one second optical whispering gallery mode with a second quality factor less than the first quality factor; and a radio frequency (RF) resonator formed on the optical resonator and structured to spatially overlap an RF field of the RF resonator with the first and second optical whispering gallery modes to cause RF energy in the RF field at a first RF carrier frequency to couple with the first optical whispering gallery mode and RF energy in the RF field at a second RF carrier frequency to couple with the second optical whispering gallery mode.

In another aspect, a method is provide to couple laser light into an optical resonator that includes an electro-optic material having a refractive index responsive to an electric field and structured to support at least one first optical whispering gallery mode having a first quality factor, and at least one second optical whispering gallery mode with a second quality factor less than the first quality factor. This method includes applying an RF field on a radio frequency (RF) resonator formed on the optical resonator and structured to spatially overlap an RF field of the RF resonator with the first and second optical whispering gallery modes, to cause RF energy in the RF field at a first RF carrier frequency to couple with the first optical whispering gallery mode and RF energy in the RF field at a second RF carrier frequency to couple with the second optical whispering gallery mode.

These and other examples and implementations are described in detail in the drawings, the detailed description, and the claims.

DETAILED DESCRIPTION

Many WGM resonators are axially or cylindrically symmetric around a symmetry axis around which the WG modes circulate in a circular path or the equator. The exterior surface of such a resonator is smooth and provides spatial confinement to light around the circular plane to support one or more WG modes. The exterior surface may be curved toward the symmetry axis to spatially confine the light along the symmetry axis. A WGM resonator may be shaped symmetrically around a symmetry axis and has a protruded belt region to form a circular path to confine light in one or more WG modes. The exterior surface of the protruded belt region may be any suitable geometrical shape such as a flat surface or a curved surface. Such a WGM resonator may be configured in any suitable physical size for a given wavelength of light. Various materials can be used for WGM resonators and include, for example, crystal materials and non-crystal materials. Some examples of suitable dielectric materials include fused silica materials, glass materials, lithium niobate materials, and calcium fluoride materials.

A whispering gallery mode resonator can be made of a material exhibiting an electro-optic effect and can include electrodes on the optical resonator to apply an RF or microwave signal to the optical resonator to effectuate the electro-optic effect to control the one or more optical whispering gallery modes circulating along a circular optical loop near a rim of the optical resonator. The electro-optic effect in such a WGM resonator can be used to tune the resonator and to modulate light for a wide range of applications.

Figure 1A:
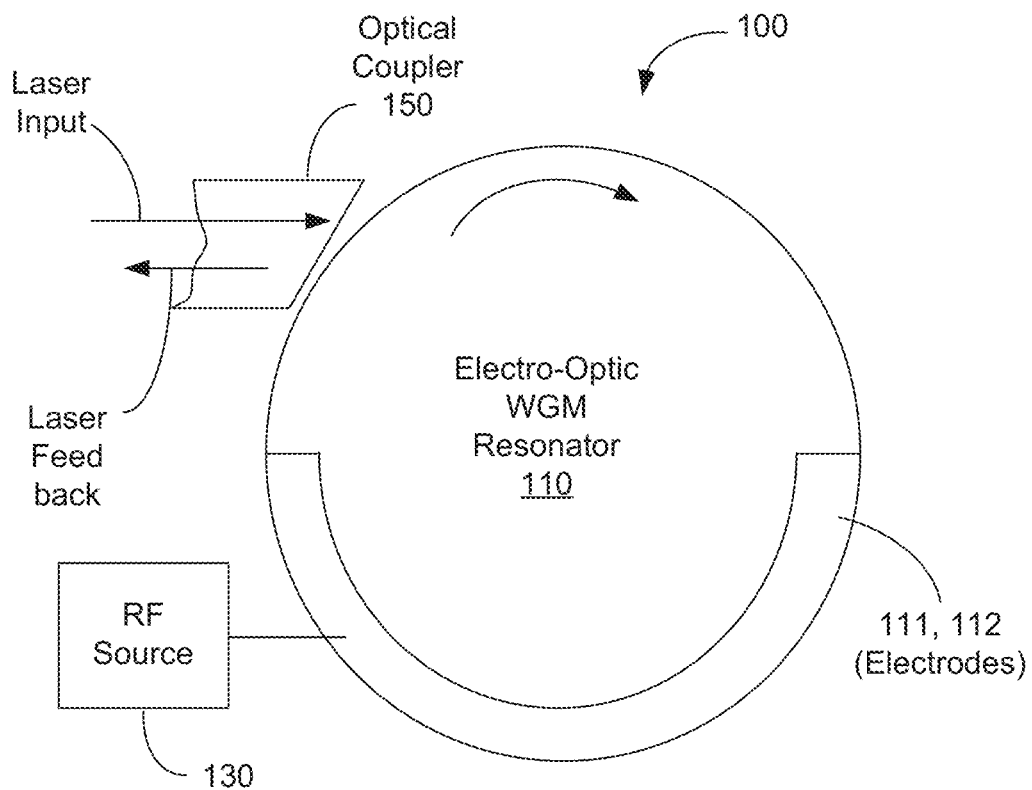
FIGS. 1A and 1B show an example of an electro-optic whispering gallery mode resonator as an optical modulator.
Figure 1B:
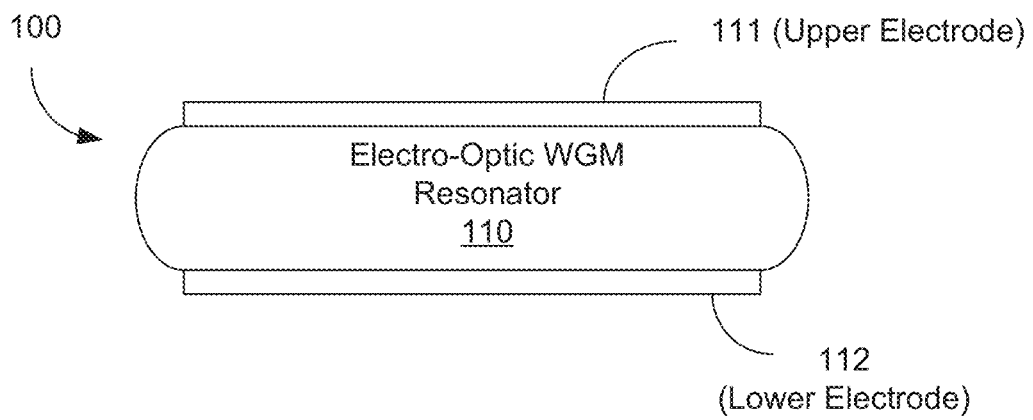

FIGS. 1A and 1B show an example of an electro-optic WGM resonator 100 having a WGM resonator 110. The electro-optic material for the entire or part of the resonator 610 may be any suitable material, including an electro-optic crystal such as Lithium Niobate ("Lithium Niobate resonator") and semiconductor multiple quantum well structures. One or more electrodes 111 and 112 may be formed on the resonator 110 to apply a control electrical field in at least the region where the WG modes are present to control the index of the electro-optical material and to change the filter function of the resonator. Assuming the resonator 110 has disk or ring geometry, the electrode 111 may be formed on the top of the resonator 110 and the electrode 112 may be formed on the bottom of the resonator 110 as illustrated in the side view of the device in FIG. 1B. In one implementation, the electrodes 111 and 112 may constitute an RF or microwave resonator to apply the RF or microwave signal to co-propagate along with the desired optical WG mode. For example, the electrodes 111 and 112 may be microstrip line electrodes. The electrodes 111 and 112 may also form an electrical waveguide to direct the electrical control signal to propagate along the paths of the WG modes. An RF or microwave circuit 130 such as a control circuit may be used to supply the electrical control signal to the electrodes 111 and 112.

An optical evanescent coupler 150, such as an optical prism, a waveguide taper, or a photonic bandgap material coupler, is provided to provide optical coupling to and from the WGM resonator 110. For example, laser light from a laser can be injected via evanescent coupling into the resonator 110. The same coupler 150 may also be used to retrieve light inside the resonator 110 as output light to injected back into the laser to lock the laser via injection locking. The light inside the resonator 110 can be coupled into a photodetector, which can be a detector of a sufficient response speed to detect the baseband RF signal modulated on to the light by the modulator in response to the received RF signal applied to the electrodes 111 and 112. As an example, the detector can be a 5-MHz photodiode that detect video signals.

In operating the tunable resonator 100, the control unit 130 may supply a voltage as the electrical control signal to the electrodes 111 and 112. The control voltage may be a DC voltage to set the resonance peak of the resonator 100 at a desired spectral location. The DC voltage may be adjusted by the control unit 130 to tune the spectral position of the transmission peak when such tuning is needed. For dynamic tuning operations, the control unit 130 adjusts the control voltage in response to a control signal to, e.g., maintain the transmission peak at a desired spectral position or frequency or to change the frequency of the transmission peak to a target position. In some other operations, the control unit 130 may adjust the control voltage in a time varying manner, e.g., scanning the transmission peak at a fixed or varying speed or constantly changing the transmission peak in a predetermined manner or to produce signal modulation. In some applications, both a modulation electrical signal and a DC electrical signal can be applied to the electrodes on the resonator 100.

For example, a Z-cut $LiNbO_3$ disk cavity with a diameter of d=4.8 mm and a thickness of 170 μm may be used as the resonator 110. The cavity perimeter edge may be prepared in the toroidal shape with a 100 μm radius of curvature. As an alternative to the strip electrodes shown in FIG. 1A, the top and bottom surfaces of the disk resonator may be coated with conductive layers for receiving the external electrical control signal. A metal such as indium may be used to form the conductive coatings. Tuning is achieved by applying and adjusting a voltage to the top and bottom conductive coatings. Each conductive coating may be absent on the central part of the resonator and are present at the perimeter edge of the resonator where WGMs are localized.

One technical feature of such an electro-optic WGM resonator is the phase matching between the applied RF and microwave signal and the light in a WGM inside the resonator to provide efficient interaction between the light and the applied RF and microwave signal. The geometry of the electrodes on the WGM resonator can be designed to facilitate this phase matching.

For an optical WGM in the resonator 110, the high Q factor leads to a high finess F and thus a narrow bandwidth in the optical WGM resonance. In various RF and other applications based on high-Q WGM resonators, wide bandwidths are desirable. The techniques in this document can be used to provide wide RF bandwidths while maintaining high quality factors to preserve the spectral selectivity and detection sensitivity of the devices. An electro-optic optical WGM resonator with two different optical modes of two different quality factors is used to implement the techniques described in this document. In one implementation, laser light is coupled into an optical resonator that includes an electro-optic material having a refractive index responsive to an electric field and structured to support at least one first optical whispering gallery mode having a first quality factor, and at least one second optical whispering gallery mode with a second quality factor less than the first quality factor. An RF field is applied on a radio frequency (RF) resonator formed on the optical resonator and structured to spatially overlap an RF field of the RF resonator with the first and second optical whispering gallery modes, to cause RF energy in the RF field at a first RF carrier frequency to couple with the first optical whispering gallery mode and RF energy in the RF field at a second RF carrier frequency to couple with the second optical whispering gallery mode. The first optical whispering gallery mode with a high Q can be used to provide the laser light inside the optical resonator by coupling the laser light into this mode. The second optical whispering gallery mode with the low Q can be used to perform optical modulation to carry an RF signal onto an optical band generated by the optical modulation.

This use of two different optical WGM modes with different Q values provide a practical approach to increasing the bandwidth of the resonant RF photonic devices such as an RF photonic receiver, without a significant degradation of the device sensitivity by RF coupling two optical modes one of which possesses a high Q factor and the other comparably low Q factor. The immediate bandwidth of such a receiver is given by the low-Q mode, while the high-Q mode results in maintaining the receiver sensitivity. Techniques are provided for realization of such a device when the RF coupling between two different mode families. In this approach, one mode family can be loaded significantly stronger than the other. The RF coupling between the modes can be realized with a composite lithium niobate (LN) or lithium tantalite (LT) resonator that includes several parts with different directions of the optical axis (similar to periodically poled lithium niobate (PPLN) structures. An inhomogeneous RF field in the resonator also can be used for the coupling. Proper spectrum engineering of WGM resonators can be used to further increase the reception bandwidth without degradation of receiver sensitivity.

One of advantages of electro-optic crystalline whispering gallery mode (WGM) resonators is their high quality (Q) factor resulting in high sensitivity of photonic RF receivers utilizing the resonators. Lithium niobate and lithium tantalate WGM resonators with quality factors in excess of $2 \times 10^8$ have been demonstrated. These resonators have been designed for modulators in photonic front end receiver applications operating in the frequency bands ranging from X- to Ka-band. The quality factors of all the WGMs used in the receiver are generally the same because the modes of the same family are used.

Many of such receivers have a bandwidth that is narrow, e.g., less than a few megahertz. Such a narrow bandwidth value restricts the number of applications of the receivers. Increasing of the bandwidth at the expense of the optical Q factor results in a decrease of the receiver sensitivity, which is proportional to $Q^2$. This narrow bandwidth may be inappropriate in some applications because increase of the reception bandwidth from, e.g., 5 MHz to 500 MHz, leads to an decrease of $10^4$ in the device sensitivity, insufficient for many applications. Moreover, it becomes more difficult to realize the injection locking of the laser pumping of the resonator to the lower Q WGMs.

In the present techniques, two optical WGM modes having significantly different Q values are used. One mode, the mode with the highest achievable Q, is used for optical pumping. Because of the high Q (=Q1) factor of the mode, the pumping laser can be easily locked to the resonator using the injection locking technique. The other mode, the mode with lower Q (=Q2), is used to produce optical sidebands in the modulator/receiver. The bandwidth of the receiver is given by the mode with the lower Q, Q2. The sensitivity is proportional to the product Q1Q2. For instance, if we use a resonator with $Q1=10^9$ and $Q2=10^7$, the sensitivity of the corresponding receiver corresponds to the sensitivity of the usual receiver having $Q=10^8$. The bandwidth of the proposed receiver corresponds to the bandwidth of the usual receiver having $Q=10^7$.

Different mode families in an optical resonator can be used to provide significantly different Qs of the modes. It is possible to unload a WGM belonging to one mode family and overload a WGM belonging to another mode family using two couplers, for instance. One technical issue is how to realize the coupling between the two different modes and the applied RF field. Two exemplary techniques are provided here for this coupling.

Figure 2:
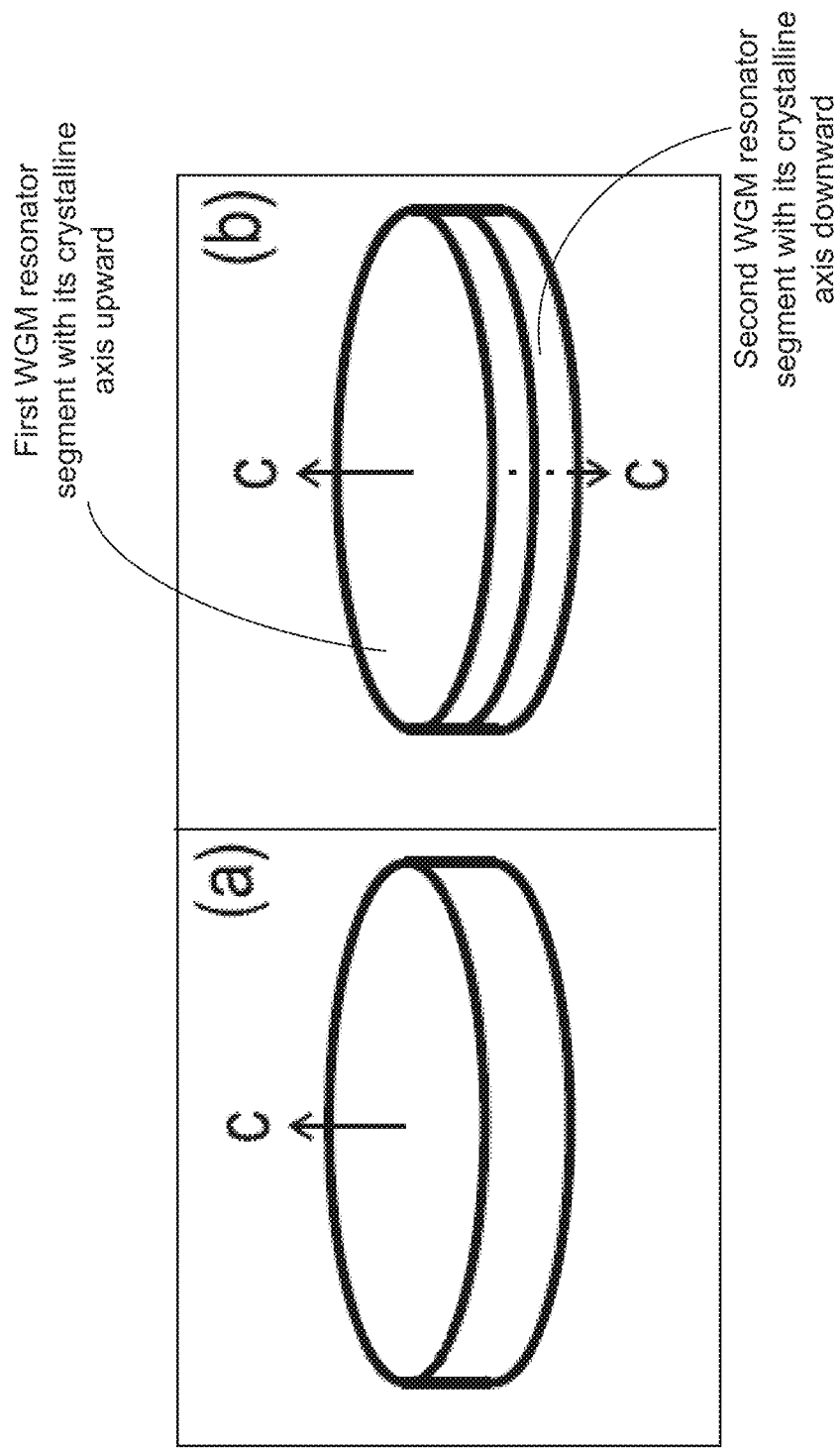
FIGS. 2(a) and 2(b) show two examples of electro-optic WGM resonators that support two different families of optical WGM modes with different quality factors.

In the first technique, the RF resonator as well as optical resonator are designed in such a way that the RF field would be inhomogeneous in the volume where the optical modes are localized. This is possible if the optical resonator has, e.g. a conical shape and/or a narrow strip line RF resonator is used in the receiver. An RF resonator can be used with the conical resonator. FIG. 2(a) shows an example of such a WGM resonator here a single electro-optic crystalline material is used.

In the second technique, the optical resonator is made out of two or more polished pieces of an electro-optic crystal with the crystalline axes directed oppositely in each pair of pieces. The resonator can be made via optical contact or glued with transparent epoxy, etc. The RF resonator can be made out of strip line. Other morphologies of RF resonators are possible. FIG. 2(b) shows an example of a resonator with two segmented pieces stacked over each other with opposite crystalline axes.

In some implementations, it is possible to achieve, at the same time, an efficient RF coupling between the basic (high-Q) and several auxiliary (low-Q) optical mode families in the resonators with two different modes of different Q values. Hence, it is possible to further increase the bandwidth of the receiver by 3 dB or so without sensitivity degradation by creating a doublet (a multiplet) of low Q modes belonging to several auxiliary mode families. The RF signal can be used to cause coupling between the high-Q mode and a low-Q mode at one carrier RF frequency, and another low-Q mode at other carrier frequency.

Figure 3:
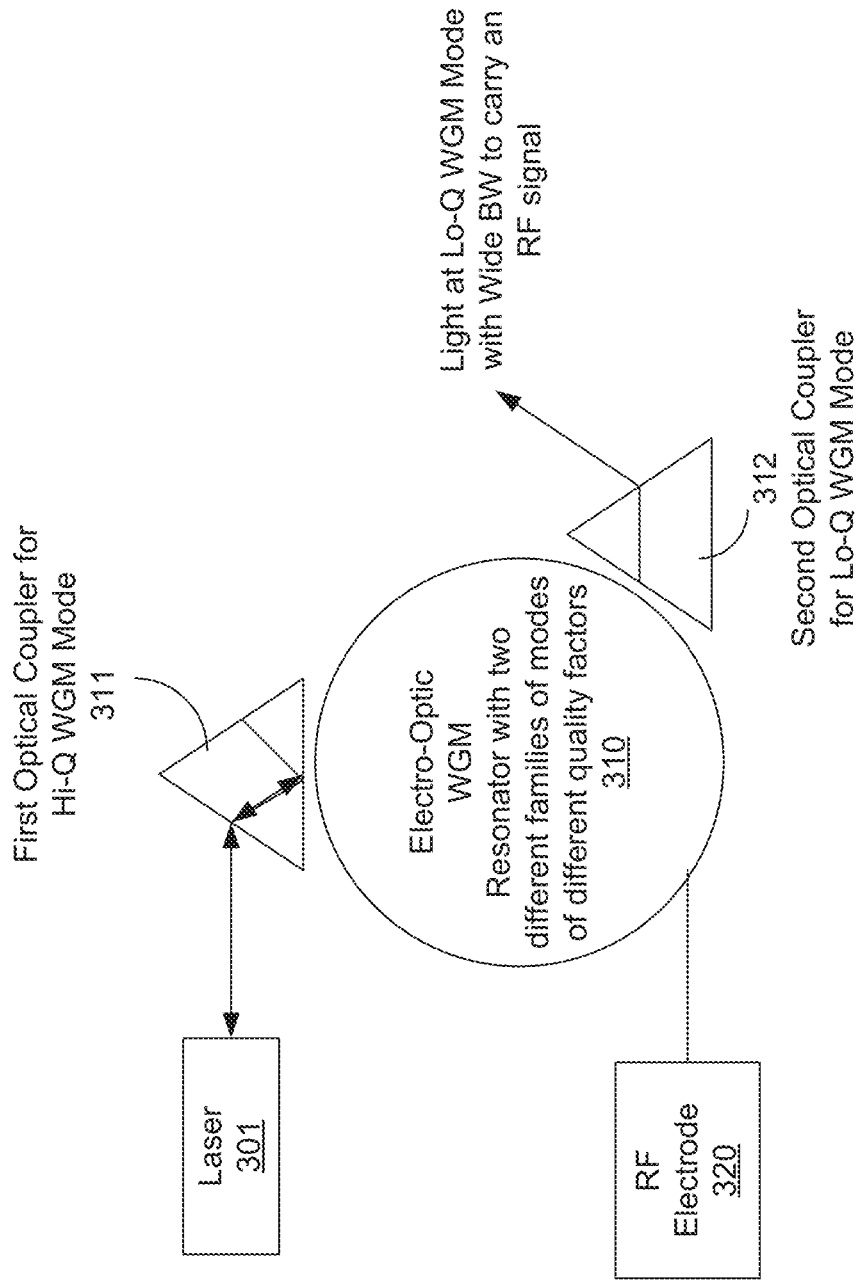
FIG. 3 shows an example of an electro-optic WGM resonator that supports two different families of optical WGM modes with different quality factors and has two optical couplers for coupling light in the two different modes.

FIG. 3 shows an example of a two-mode WGM resonator based on the above. A WGM resonator 310 is made of an electro-optic material and supports at least a first high-Q WGM mode and a second low-Q WGM mode. RF electrodes 320 are formed on the resonator 310 to apply an RF signal. A first optical coupler 311 is optically coupled to the resonator 310 to couple light in the first high-Q WGM mode and a second, separate optical coupler 312 is optically coupled to the resonator 310 to couple light in the second low-Q WGM mode. A laser 301 is provided to produce laser light for optically energizing the resonator 310 and the laser light is directed to the coupler 311. The same coupler 311 may also be used to couple light in the first WGM mode out of the resonator 310 and direct the light back into the laser 310 to achieve injection locking of the laser 301 to the first high-Q WGM mode.

Figure 4A:
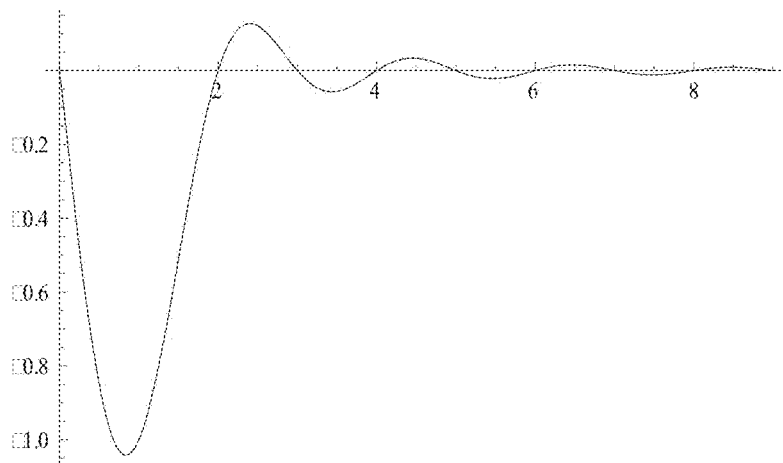
FIGS. 4A, 4B and 4C show simulation results of optical coupling in WGM resonators.
Figure 4B:
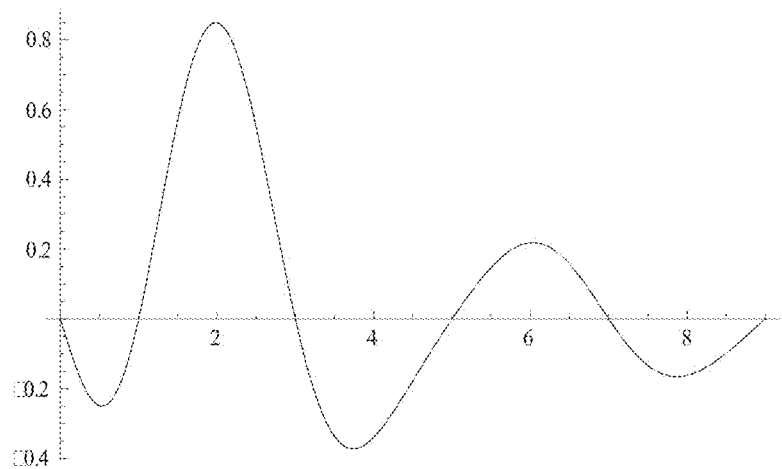
Figure 4C:
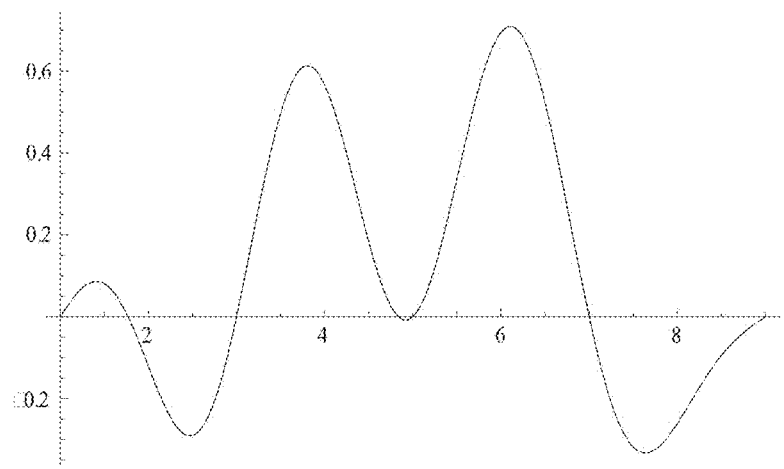

FIGS. 4A, 4B and 4C show simulated optical coupling under different conditions. FIG. 4A shows normalized RF coupling coefficient between WGMs of a homogeneous cylindrical resonator with the crystalline axis coinciding with the symmetry axis of the cylinder as shown in FIG. 2(a). Integer abscissa coordinates correspond to the quantum mode numbers j'. We consider the RF coupling between optically pumped modes having transverse quantum number equal to j=1 (the basic mode sequence) and all modes of the resonator separated from the given pumped mode by FSR and having numbers j'. Hence, there is a strong coupling between the modes belonging to the same, basic, mode family (j'=j=1), however there is no coupling between the modes in the basic mode family (j=1) and the other mode families. We are unable to load one mode belonging to the basic mode family and unload the modes belonging to the same family and detuned by an FSR from the optically pumped mode. The modes are localized in the same geometrical area. Hence, a resonant WGM receiver based on such a resonator should have a narrow bandwidth and possess large sensitivity.

FIG. 4B shows normalized RF coupling coefficient between WGMs of the composite cylinder consisting of two identical cylinders with the opposite direction of the crystal-line axis as shown in FIG. 2(b). Consider the RF coupling between the modes having transverse quantum number equal to j=1 (the basic mode sequence) and all the modes of the resonator separated from the given mode by FSR and having numbers j'. There is no coupling between the modes belonging to the basic mode family (j'=j=1), however there is a coupling between the modes in the basic mode family and modes with j'=2, 4, 6, etc. Those modes do not overlap completely to allow loading one mode and unloading the other. To realize the wide band receiver we need to load the auxiliary modes and critically load modes with j=1.

FIG. 4C shows normalized RF coupling coefficient between WGMs of the composite cylinder consisting of two identical cylinders with the opposite direction of the crystal-line axis in FIG. 2(b). Consider the RF coupling between modes having transverse quantum number equal to j=5 and all the modes of the resonator separated from the given mode by FSR and having numbers j'. As shown by FIG. 4C, there is no coupling between the modes belonging to the same mode family (j'=j=5), however there is a coupling between modes with j'=4 and j'=6. Hence, to realize the wide band receiver, we need to load modes with j'=4 and 6, and critically load modes with j=5.

An analysis for electrooptic coupling between two different WGM families of the same polarization is provided below.

First, consider a WGM resonator with an inhomogenous RF filed. To realize an single sideband electro-optic modulatoin (SSB EOM), the modes with $j_a \neq j_b$ are used to interact with the applied RF field on the resonator. This is possible if the RF field is inhomogeneous within the optical resonator, for example, if $$E_M(z) = E_M(0)\left[1 + \xi_1 \frac{\pi(z-L)}{L} + \xi_2 \frac{\pi^2(L-z)^2}{L^2}\right],$$

where $\xi_1$ and $\xi_2$ are some dimensionless numeric parameters. The linear inhomogeneity of the RF field mixes any odd and even WGM modes $$\frac{\zeta_1(j_a, j_b)}{\zeta_0(j,j)} = -\frac{8\xi_1}{\pi} \frac{j_a j_b}{(j_a - j_b)^2},$$

where $\zeta_0(j,j)$ is the phase matching coefficient for the same family of WGMs interacting with the RF. The quadratic nonlinearity mixes all the modes $$\frac{\zeta_2(j_a, j_b)}{\zeta_0(j,j)} = \frac{8\xi_2 j_a j_b}{(j_a^2 - j_b^2)^2}.$$

Another way to couple RF and WGMs with different js is to create a segmented resonator having two lithium niobate or lithium tantalate disks with opposite directions of c-axis as shown in FIG. 2(b). All the modes having different J-numbers can interact in such resonators. In this case the overlap integral is proportional to $$\frac{\zeta_3(j_a, j_b)}{\zeta_0(j,j)} = \frac{2}{L}\left[\int_0^{L_1} - \int_{L_1}^{L}\right]\sin\left[\frac{\pi j_a z}{L}\right]\sin\left[\frac{\pi j_b z}{L}\right]dz,$$

where $L_1$ is the thickness of one of the discs. Varying $L_1$ it is possible to achieve phase matching for interaction of RF with optical modes belonging to different families. For instance, if $L_1 = L/\sqrt{2}$, we have for the first mode $\zeta_3(1,1) \approx 0.72\zeta_0(1,1)$, $\zeta_3(1,2) \approx 0.43\zeta_0(1,1)$, $\zeta_3(1,4) \approx 0.21\zeta_0(1,1)$, and so on.

Under the condition of $L_1 = L/2$, it is possible to have an efficient RF coupling between modes j and j±1. For instance, the first mode can be coupled to all even modes $\zeta_3(1,2) \approx 0.85\zeta_0(1,1)$, $\zeta_3(1,4) \approx -0.34\zeta_0(1,1)$, $\zeta_3(1,6) \approx 0.22\zeta_0(1,1)$. The second mode can be coupled to all odd modes $\zeta_3(2,1) \approx 0.85\zeta_0(1,1)$, $\zeta_3(2,3) \approx -0.34\zeta_0(1,1)$, $\zeta_3(2,5) \approx -0.12\zeta_0(1,1)$. On the other hand, the coupling between the modes of the same family does not occur in such a resonator.

Figure 5:
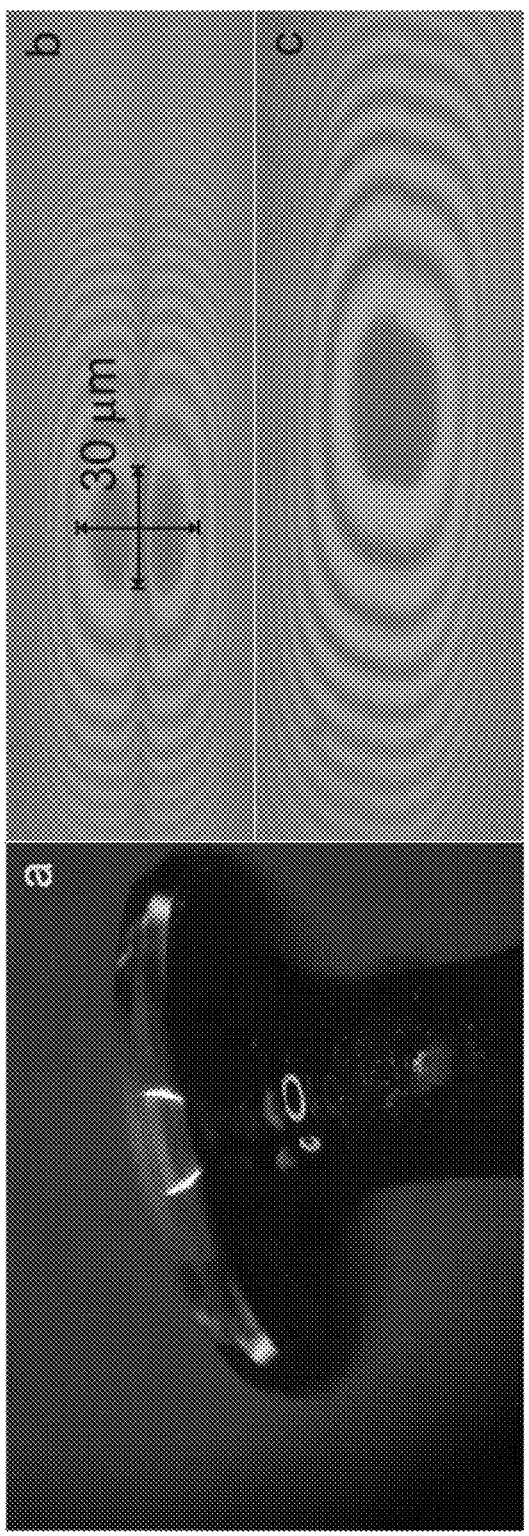
FIG. 5 shows an example of a segmented an electro-optic WGM resonator that supports two different families of optical WGM modes with different quality factors.

FIG. 5(a) shows a photograph of the segmented resonator fabricated out of lithium tantalate. FIGS. 5(b) and 5(c) show photographs of interference fringes arising between r and a flat surface taken in green light. The connection between the segments can be nearly seamless.

Samples of several segmented WGM resonators were fabricated out of lithium tantalate. The resonators have 1.25 mm in diameter and 100 μm in thickness and include two nearly identical segments with opposite poling glued to each other. The optical Q-factor of the WGM resonators exceeds $2 \times 10^8$, which basically shows that the epoxy does not degrade the Q-factor of the optical modes (Q-factor of typical LiTaO$_3$ resonators we make is approximately the same).

The above WGM resonators with two different modes of different Q values can be used to construct various devices including RF photonic receivers.

Figure 6:
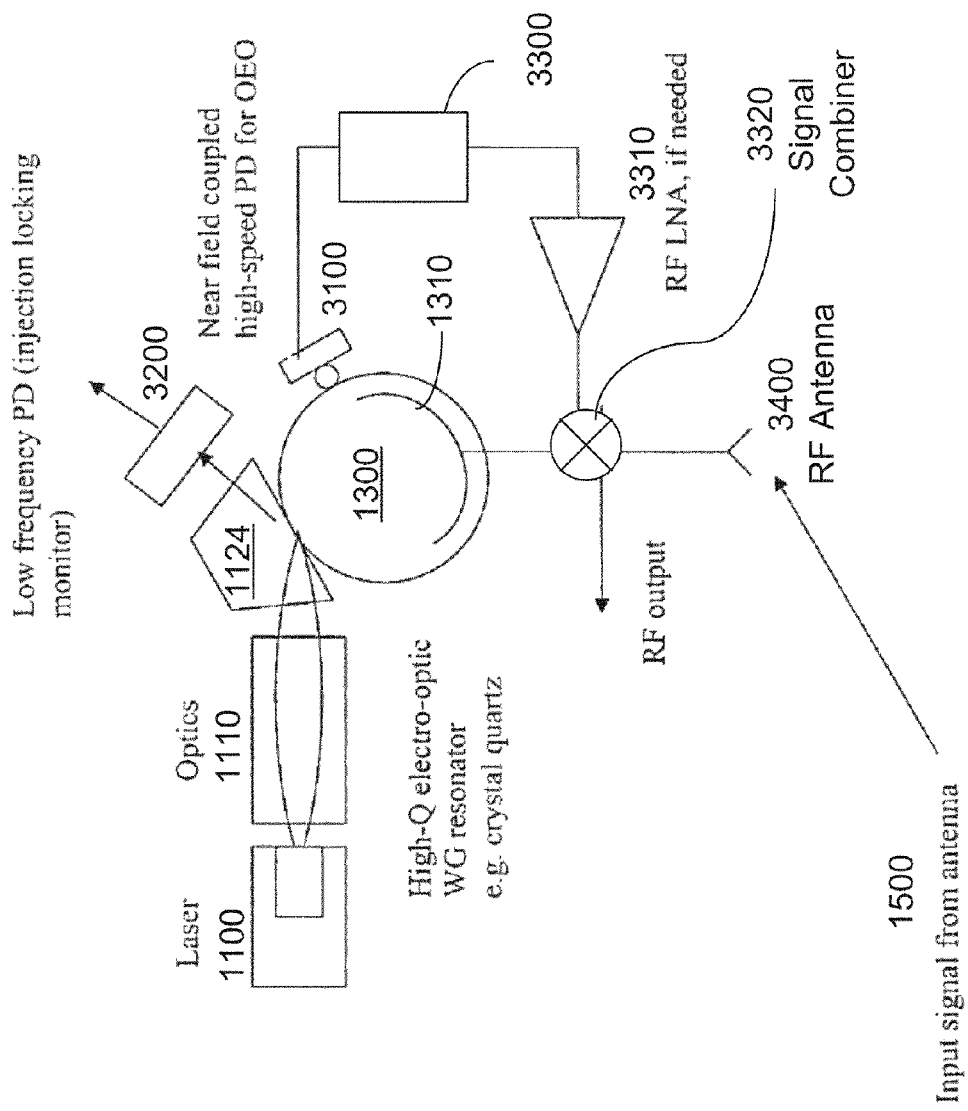
FIG. 6 shows an example of an RF photonic receiver based on an electro-optic WGM resonator that supports two different families of optical WGM modes with different quality factors.

FIG. 6 shows one implementation of an RF receiver with a single WGM resonator for modulation and laser injection locking. The laser 1100 provides laser light to optically pump the electro-optic WGM resonator 1300. Optics 1110 is provided to direct the laser light from the laser 1100 to the resonator 1300. A high sensitivity lithium niobate resonance WGM light modulator is provided to receive the stabilized laser light from the laser 1100 and to modulate the received light based on the received RF signal 1500 via an RF antenna 3400 (e.g., at 35 GHz). The modulator includes the electro-optical WGM resonator 1300 made of an electro-optic material and has electrodes 1310 formed thereon to apply a control voltage to change the index of the resonator to cause optical modulation to light confined in one or more WG modes. The RF antenna 3400 is electrically coupled to the electrodes 1310 on the resonator 1300 to apply the received RF signal 1500 to the resonator 1300 to modulate light inside the resonator 1300. An optical evanescent coupler 1124, such as an optical prism, is provided to provide optical coupling to and from the WGM resonator 1300 for light in the high-Q WGM mode. The laser light from the laser 1100 is injected via evanescent coupling into the resonator 1300 and to retrieve light inside the resonator 1300 from the resonator 1300 as output light. A second optical coupler, designed for coupling light in the low-Q WGM mode, is provided to couple light out of the resonator 1300 into the detector 3100 which is a near-field coupled high speed photodiode evanescently coupled the resonator 1300 to detect light and to produce a detector signal. This signal is sent to a feedback control circuit 3300 which conditions the signal, e.g., controlling the phase or delay of the signal and filtering the signal to select a particular frequency in the feedback loop. An amplifier 3310 is connected downstream from the circuit 330 to amplify the signal as a feedback signal to a signal combiner 3320. The signal combiner 3320 is coupled to an antenna or receiver circuit 3400 that receives the RF signal 1500 and combines the signal from the amplifier 3310 and the RF signal 1500 into a control signal. This control signal is fed into the electrodes 1310 on the resonator 1300 to modulate the light inside the modulator 1300. This design forms an opto-electronic loop with an optical portion that includes the optical resonator 1300 as an optical delay element and an optical modulator, and an electrical portion which includes the photodiode 3100, the circuit 3300, the amplifier 3310, the signal combiner 3320 and the electrodes 1300. This is a closed loop and can be operated to have a loop gain higher than the loop loss and the feedback to the resonator 1300 can be in phase. Under such conditions, the closed loop is a positive feedback loop and will oscillate as an opto-electronic oscillator (OEO) at a frequency at which the light in the resonator 1300 is modulated. In this OEO, the laser light from the laser 1100 is also modulated due to the feedback light from the resonator 1300. The resonator 1300 provide the optical delay in the loop to reduce the phase noise of the loop that may be difficult to achieve with a conventional RF voltage-controlled oscillator. As indicated, an RF output can be generated in the electrical portion of the opto-electronic loop, e.g., at the signal combiner 3320. A second detector 3200 is used to provide low frequency detection for monitoring the injection locking operation.

Another detector of a sufficient response speed can also be provided to receive light coupled out of the second optical coupler for coupling light in the low-Q WGM mode. This detector is used to detect the baseband RF signal modulated on to the light by the modulator 1300 in response to the received RF signal 1500 at the RF antenna 3400. As an example, this second detector can be a 5-MHz photodiode that detects video signals.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, it is understood that variations, enhancements and other implementations can be made based on what is described and illustrated in this document.

What is claimed is:

1. A radio frequency (RF) photonic receiver based on photonic signal processing via an electro-optic effect, comprising:

an optical resonator formed of an electro-optic material and shaped to support (1) at least one high quality factor optical mode having a narrow bandwidth, and (2) at least one low quality factor optical mode with a broader bandwidth than the narrow bandwidth of the high quality factor optical mode;

an optical coupler that couples external laser light into the optical resonator in the high quality factor optical mode into the narrow bandwidth to optically energize the optical resonator;

means for applying a spatially inhomogeneous RF field to the electro-optical material in a region of the optical resonator where the high quality factor and low quality factor optical modes are localized to cause optical coupling that transfers optical energy from the high quality factor optical mode to the low quality factor optical mode;

means for applying an RF signal modulation in the RF field to cause an electro-optic modulation of the light in the low quality factor optical whispering gallery mode to produce modulated light in the low quality factor optical mode that carries the RF signal modulation in the broader bandwidth than the narrow bandwidth of the high quality factor optical mode; and means for converting the modulated light in the low quality factor optical mode into an RF output signal that carries RF signal modulation, thus effectuating an increase in the bandwidth of the RF photonic receiver beyond what is permitted by the narrow bandwidth of the high quality factor optical mode of the optical resonator.

2. The RF photonic receiver as in claim 1, comprising:
   a feedback control circuit that produces a feedback control signal from the RF output signal as part of the RF field that is applied to the electro-optical material to enable a closed opto-electrical loop to cause a signal oscillation in the RF photonic receiver.

3. The RF photonic receiver as in claim 1, wherein the optical resonator is a conically shaped whispering gallery mode resonator, and the high quality factor optical mode and the low quality factor optical mode are whispering gallery modes.

4. The RF photonic receiver as in claim 1, wherein the optical resonator is a whispering gallery mode resonator, and the high quality factor optical mode and the low quality factor optical mode are whispering gallery modes.

* * * * *